United States Patent

[11] 3,593,579

| [72] | Inventors | Daniel T. Hindman<br>Kenmore;<br>Paul J. Hufnagel, Getzville, both of, N.Y. |
|---|---|---|
| [21] | Appl. No. | 842,291 |
| [22] | Filed | July 16, 1969 |
| [45] | Patented | July 20, 1971 |
| [73] | Assignee | Mennen-Greatbatch Electronics, Inc.<br>Clarence, N.Y. |

[54] LIQUID DROP SENSING AND COUNTING SYSTEM
8 Claims, 4 Drawing Figs.

[52] U.S. Cl. .................................................. 73/194 E,
128/214
[51] Int. Cl. ..................................................... G01f 3/00,
A61m 5/00
[50] Field of Search ............................................ 73/194, 194
E, 229—231, 432; 141/83; 324/71 P C; 128/214;
235/201, 92; 222/59

[56] References Cited
UNITED STATES PATENTS

| 2,880,764 | 4/1959 | Pelzvin ......................... | 73/194 X |
| 3,216,252 | 11/1965 | Chapman ...................... | 73/229 |
| 3,252,623 | 5/1966 | Corbin ......................... | 128/214 X |
| 3,500,024 | 3/1970 | Stacy........................... | 235/92 |

Primary Examiner—Richard C. Queisser
Assistant Examiner—C. E. Snee, III
Attorney—Christel and Bean ABSTRACT: Apparatus for sensing and counting a flow of liquid drops including a nozzle communicating with the liquid to be measured and providing liquid drops in a first path. Gas under pressure in the range giving rise to a laminar flow is directed, as by a nozzle, in a second path positioned so as to be interrupted by the liquid drops. A pressure transducer in communication with the gas stream provides an electrical signal in response to each pressure decrease caused by a liquid drop interrupting the gas flow. The transducer is operatively connected to a suitable counter.

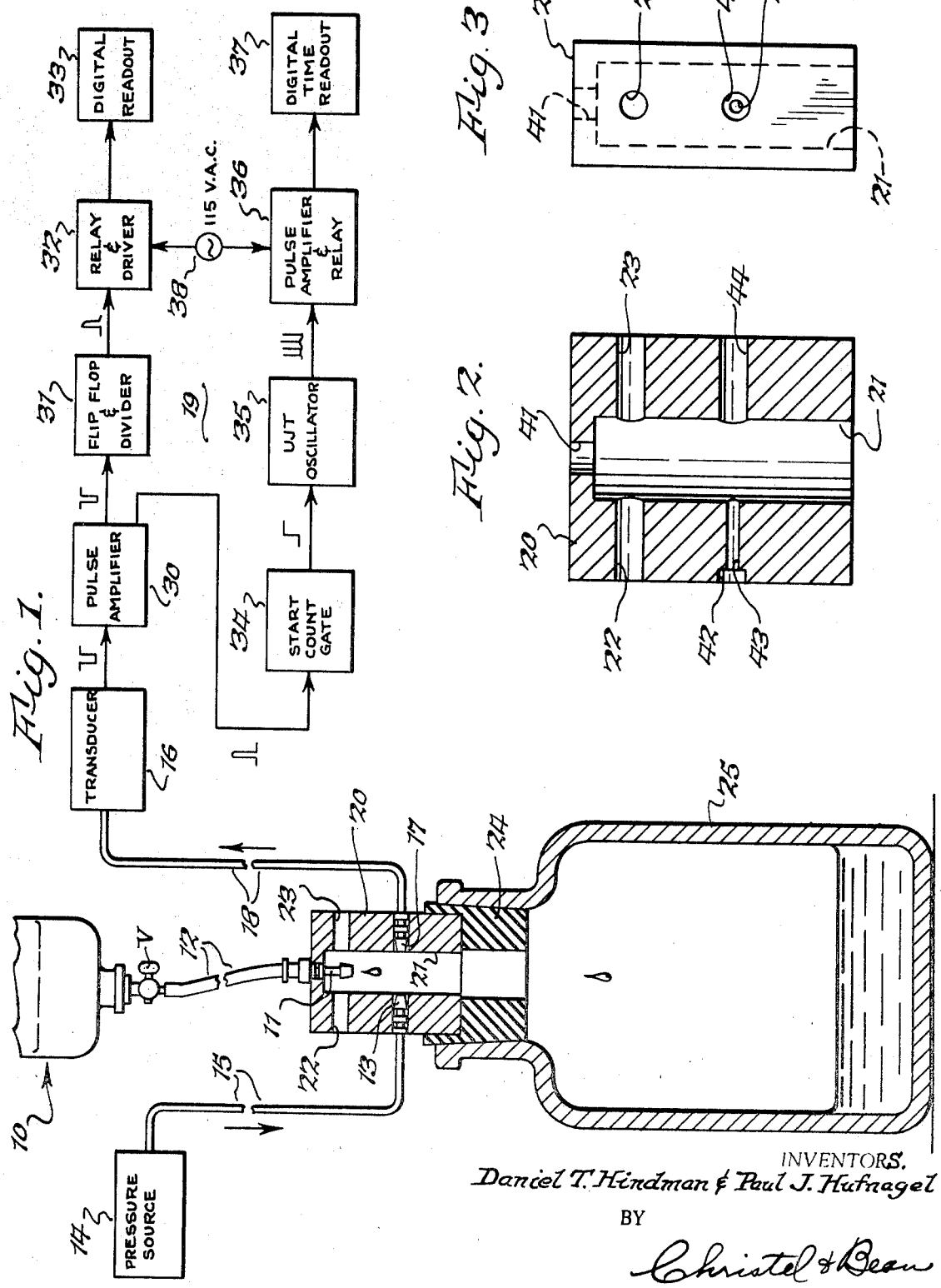

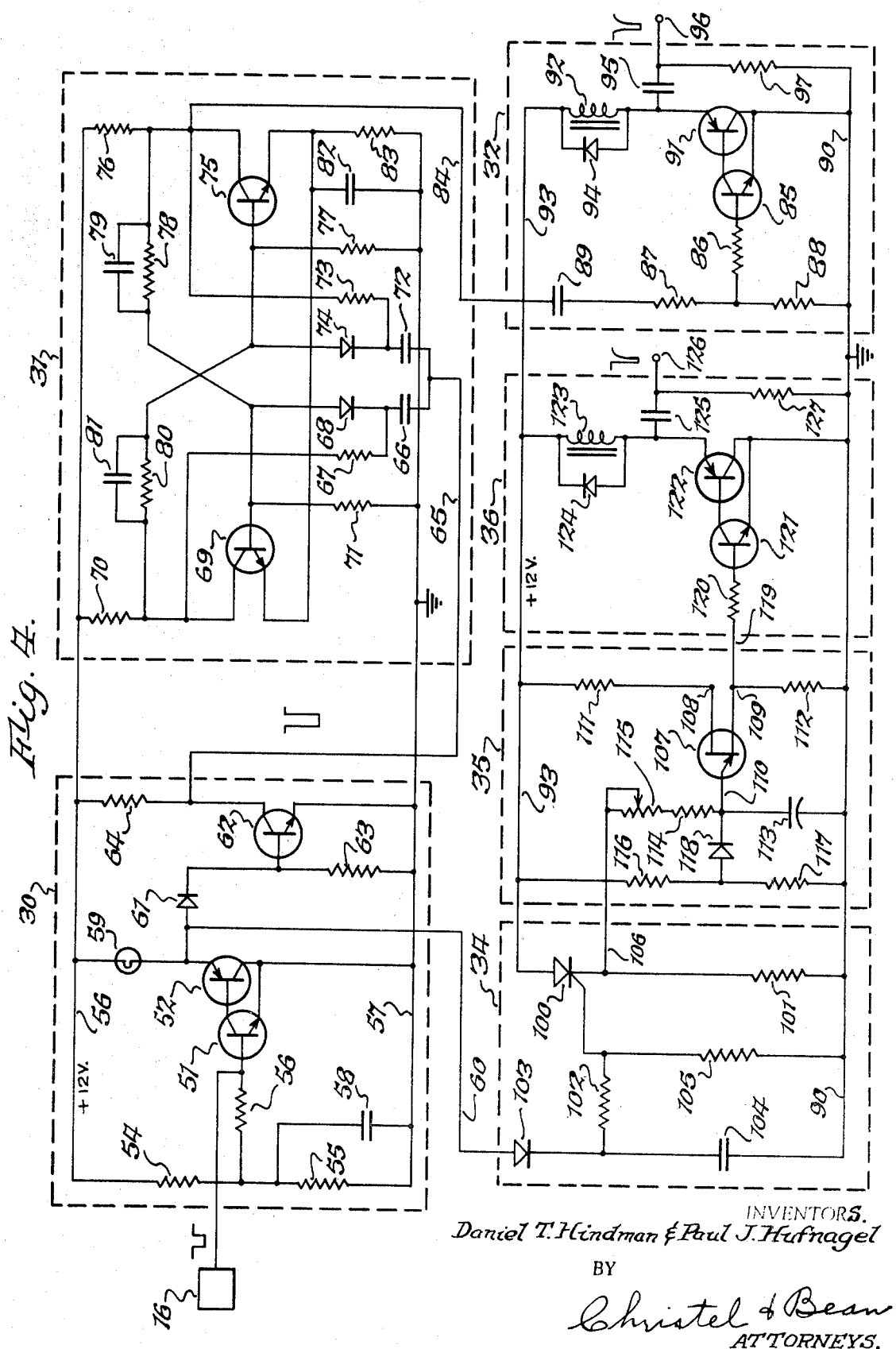

3,593,579

1

LIQUID DROP SENSING AND COUNTING SYSTEM

BACKGROUND OF THE INVENTION

The present invention relates to liquid-flow-measuring apparatus and, more particularly, to apparatus for sensing and counting the flow of liquid drops.

One area of use of the present invention is in medical procedures wherein the rate at which liquids such as urine are expelled from a patient's body must be known, or wherein the rate at which treatment liquids are introduced into the patient's body must be controlled to an exact degree. The present invention will be described in conjunction with the measurement of urine expelled from a patient's body, although the principles of the invention can be variously applied to the sensing and counting of drops of other types of liquids and in other situations and environments.

One method widely employed heretofore for sensing and counting the flow of liquid drops includes passing a light beam through the path of the drops and sensing interruptions in the beam caused by means of a photocell. The electrical signals provided by the photocell are used to activate an electronic counter which registers the amount of flow during a given unit of time. With urine being transmitted from a patient through a catheter so as to enter a transparent receptacle in drop form, after a time deposits form on the inside of the receptacle rendering it increasingly opaque and thus interfering with the light beam which must pass through the receptacle in order to be interrupted by the drops. This, in turn, requires frequent replacement or cleaning of the receptacles which obviously is undesirable especially in hospitals where a shortage of personnel often exists. Another disadvantage of the photoelectric technique is the inherent unreliability of the incandescent lamps normally used.

SUMMARY OF THE INVENTION

It is, therefore, an object of this invention to provide a liquid drop sensing and counting system which is operable independently of the light-transmitting characteristics of the conduits and receptacles through and into which the liquid and drops move.

It is a further object of this invention to provide such a liquid drop sensing and counting system of the type wherein the drops are passed through a sensing medium and interruptions therein are counted in such a way that flow is not impeded.

It is a more particular object of this invention to provide such a liquid drop sensing and counting system wherein the resulting information is visual and in terms of volume per unit of time.

The present invention provides apparatus for sensing and counting a flow of liquid drops wherein liquid drops are formed and in a manner defining a first flow path and wherein a laminar stream of gas is defined in a second path in a direction whereby the gas flow is interrupted by a liquid drop. Interruptions in the stream are manifested by a decrease in pressure which is sensed and utilized to activate a suitable counting means.

The foregoing and additional advantages and characterizing features of the present invention will become clearly apparent upon a reading of the ensuing detailed description of an illustrative embodiment thereof together with the included drawings depicting the same.

BRIEF DESCRIPTION OF THE DRAWING FIGURES

FIG. 1 is a schematic diagram of a liquid drop sensing and counting system constructed in accordance with the present invention;

FIG. 2 is an enlarged sectional view of a preferred form of a component of the flow-defining means for use in the system of FIG. 1;

FIG. 3 is an elevational view of the flow-defining means component shown in FIG. 2; and FIG. 4 is a schematic diagram of a preferred circuit arrangement for the counting means included in the system of FIG. 1.

DETAILED DESCRIPTION OF AN ILLUSTRATIVE EMBODIMENT

FIG. 1 is a schematic diagram of a system constructed in accordance with the present invention for measuring a flow of liquid by sensing and counting the flow of liquid drops. The drops to be sensed and counted can arise from any source, here shown in general form as liquid-containing receptacle 10. One particularly advantageous use of the system of this invention is in the medical procedure of sensing and counting urine drops in which case the source of liquid would comprise a catheter inserted into the patient. The apparatus of the present invention comprises drop-forming means in the form of nozzle 11 for providing liquid drops in a first path as illustrated in FIG. 1. The drop size can be controlled or calibrated by means of the particular size and construction of nozzle 11 to facilitate flow measurement. Nozzle 11 is connected to liquid source 10, in this particular illustration through a length of hollow, flexible tubing 12 and a conventional petcock or valve V. When the system of the present invention is used to count urine drops, tubing 12 would be in communication with the catheter inserted in the patient.

The apparatus of the present invention further comprises flow-defining means in the form of nozzle 13 adapted to be connected to a source of gas under pressure, designated generally at 14 in FIG. 1. More specifically, source 14 can be any readily accessible source of gas or air available at relatively low pressure within the range giving rise to a laminar flow. The purpose of flow-defining means or nozzle 13 is to provide a flow of gas in a second path in a direction whereby the gas flow is interrupted by a liquid drop. In the arrangement shown in FIG. 1, the longitudinal axes of nozzles 11 and 13 are disposed generally in the same plane and oriented substantially at right angles with respect to each other. Nozzle 13 can be connected to pressure source 14 by any suitable means, in this particular example by a length of flexible tubing 15.

The apparatus provided by the present invention also comprises a pressure transducer 16 for providing an electrical signal in response to each interruption of the gas flow by a liquid drop. Transducer 16 is in communication with the gas flow by means of a receiving nozzle 17 connected by a length of flexible tubing 18 to the input of transducer 16. More specifically, nozzle 17 is disposed in the arrangement of FIG. 1 so that the axis thereof is coincident with that of nozzle 13 whereby a stream of gas flowing from nozzle 13 enters nozzle 17 through the orifice thereof and is communicated therefrom by tubing 18 to transducer 16.

The apparatus of the present invention also comprises counting means 19 operatively connected to transducer 16 for indicating or registering the number of liquid drops formed during any given interval of time. When the size of each drop is controlled or regulated, a simple conversion to flow rate can be made, for example from number of drops per unit of time to number of cubic centimeters per unit of time. The method and means whereby drop size is calibrated or regulated together with the manner in which the conversion can be performed will be explained in detail hereafter.

Nozzles 11, 13 and 17 can be supported conveniently in a unitary element or body 20 provided with a central bore or passage 21 extending along the direction of the path of liquid drops. Body 20 is provided also with laterally directed exhaust passages 22, 23 which extend outwardly from passage 21. Element 20, the structure of which will be described in more detail presently, conveniently can be molded or machined from plastic or Plexiglass material. In the arrangement illustrated in FIG. 1 body 20 rests or is supported on the top or stopper cap 24 of a receptacle 25 into which the liquid drops fall for collection or storage. Element 20 can be attached to cap 24 by any suitable means, for example by merely a friction fit between the one end of element 20 and a recess provided in the top surface of cap 24 as shown in FIG. 1. Cap 24 is provided with a central bore in communication with passage 21 in element 20 whereby liquid drops leaving nozzle 11 after passing through the gas stream enter receptacle 25. It should be noted that any clouding of receptacle 25 or formation of deposits on the surfaces thereof, a common occurrence when the liquid being measured is urine, will not affect the operation of the apparatus. Moreover, receptacle 25 can be filled to the top thereof with the liquid without producing any effect on the sensing and counting operation of the apparatus.

Transducer 16 should be of the type operable at low pressure and responsive to relatively small changes from the equilibrium-operating pressure. One transducer found to function especially well in the apparatus of the present invention is available commercially under the designation Fairchild PSF100A. While transducer 16 in preferred form provides an electrical signal in response to each interruption, in another form the transducer might do so only after a predetermined number of such interruptions in which case-counting means 19 would be modified accordingly. Counting means 19 in the arrangement illustrated in FIG. 1 functions to provide information in digital form as to both the number of drops of liquid and the elapsed time. Counting means 19 includes, briefly, a pulse amplifier 30, the input of which is connected to the output of transducer 16. Pulse amplifier 30 provides signals to two channels, one of which includes a flip-flop 31, relay and driver circuit 32, and digital readout equipment 33, connected successively in series as shown in FIG. 1. The other channel includes a gate circuit 34, the output of which is connected to an oscillator 35 which, in turn, is connected to the input of a pulse amplifier and relay circuit 36. The output of circuit 36 is connected to the input of digital time readout equipment 37, and a source of alternating current 38 is connected to components 32 and 36 in each of the two channels.

The digital readout components designated 33 and 37 in FIG. 1 are well known in structure and operation to those skilled in the art, so a detailed description thereof is believed unnecessary. In addition, such equipment is readily commercially available, and one found to work satisfactorily in the system of the present invention is available under the commercial designation, Durant 4Y9434T. It should be noted also that counting means 19 is illustrative of one of several arrangements whereby information as to the number of drops intercepting the gas stream can be derived from the electrical signals provided by transducer 16.

FIGS. 2 and 3 show in more detail a preferred form of supporting block or body 20 which is a component of the flow-defining means of the present invention. Block 20 can be made of Plexiglass material, and in one exemplary application block 20 was constructed to have external dimensions of 1.0 by 1.25 by 0.50 inch. Central bore or passage 21 can have a diameter of 0.322 inch and a length of 1.05 inch whereupon it communicates with a smaller diameter bore 41 having a diameter of 0.12 inch to facilitate securement of nozzle 11. Exhaust passages 22, 23 are provided by a single bore extending through block 20, the axis of which bore is perpendicular to the axis of central bore 21 and, in this particular example, spaced about 1 inch from the end of block 20 from which the liquid drops exit. The diameter of this single bore providing passages 22, 23 is 0.12 inch. A passage for the entrance of gas into block 20 is located about midway along the length thereof and is defined by a first bore 42 having a diameter of 0.120 inch extending from the outer surface of block a distance of about 0.10 inch toward the middle thereof where it communicates with a smaller diameter bore 43, in particular 0.041 inch in diameter, which bore 43 extends into communication with central bore 21. With this arrangement, nozzle 13 shown in FIG. 1 can be omitted and tubing 15 merely connected in bore 42. A passage for the communication between the gas stream and transducer 16 is defined by bore 44 having an axis coincident with the axis of bore 43 and a diameter of 0.120 inch. The common axis of bores 42, 43 and 44 is disposed perpendicular with respect to the axis of bore 21 and is located about 0.50 inch from the end of block 20 from which liquid drops exit.

The foregoing specific construction and dimensions of body 20 of the flow-defining means have been described for the purpose of facilitating an understanding of the invention through a specific illustrative example thereof. Other materials and dimensions can of course be used without departing from the spirit and scope of this invention.

In combination with the specific form of block 20 just described, nozzle 13 of the flow-defining means can comprise a standard Luerlok nozzle which is filled and then provided with an internal bore having a diameter corresponding to that of a 060 drill. Nozzle 17 of the flow-defining means can comprise a B-D Luerlok nozzle with no required modifications. The internal diameter of nozzle 17, therefore, is significantly greater than that of nozzle 13. Drop-forming means or nozzle 11 can comprise a B-D Luerlok bushing having an orifice diameter of 0.070 inch. The orifice is smoothed by polishing.

FIG. 4 shows in further detail a preferred circuit arrangement for various components of counting means 19 shown in the block diagram of FIG. 1. The output of transducer 16 is applied through a lead 50 to the input of pulse amplifier 30, in particular to the base terminal of a first amplifier transistor 51, the collector terminal of which is connected to the base terminal of a second amplifier transistor 52. The base terminal of transistor 51 is connected through a resistor 53 to a voltage divider comprising resistors 54 and 55 connected between a positive bias voltage lead 56 and a ground potential lead 57. A bypass capacitor 58 is connected across resistor 55. The emitter terminal of transistor 51 and the collector terminal of transistor 52 are connected together to ground lead 57, and the emitter terminal of transistor 52 is connected through an indicator lamp 59 to positive voltage lead 56. The emitter terminal of transistor 52 also is connected through a lead 60 to the input of start count gate 34 and through a diode 61 to the base terminal of an inverter transistor 62. The base terminal of transistor 62 is connected through resistor 63 to ground, the collector terminal through resistor 64 to positive bias voltage lead 56, and the emitter terminal directly to ground. The output of pulse amplifier 30, available at the collector terminal of transistor 62, is applied to the input of flip-flop and divider circuit 31 through a lead 65.

Flip-flop and divider circuit 31 includes a first network connected to the input thereof, in particular a capacitor 66, one terminal of which is connected to lead 65 and the other terminal of which is connected to a resistor 67 and to the cathode of a diode 68. The anode of diode 68 is connected to the control or base terminal of a switching transistor 69, the collector terminal of which is connected to resistor 67 and through a biasing resistor 70 to positive voltage line 56. The base terminal of transistor 69 is connected through a biasing resistor 71 to ground potential lead 57. Flip-flop and divider circuit 31 also includes a second network connected to the input thereof, in particular a capacitor 72, one terminal of which is connected to lead 65 and the other terminal of which is connected to a resistor 73 and to the cathode of a diode 74. The anode of diode 74 is connected to the control or base terminal of a second switching transistor 75, the collector terminal of which is connected to resistor 73 and through a biasing resistor 76 to positive bias voltage line 56. The base terminal of transistor 75 is connected through a biasing resistor 77 to ground lead 57. The collector terminal of switching transistor 75 is connected through the parallel combination of resistor 78 and capacitor 79 to the base terminal of switching transistor 69 and, likewise, the collector terminal of transistor 69 is connected through the parallel combination of resistor 80 and capacitor 81 to the base terminal of transistor 75. The emitter terminals of switching transistors 69 and 75 are connected together through the parallel combination of capacitor 82 and resistor 83 to ground. A lead 84 connected to the collector terminal of transistor 75 transmits the output of flip-flop and divider circuit 31 to the input of relay and driver circuit 32.

Relay and driver circuit 32 includes a first amplifier transistor 85, the base terminal of which is connected through a resistor 86 to a voltage divider comprising resistors 87 and 88. Resistor 87 is coupled through a capacitor 89 to lead 84, and resistor 88 is connected to a ground potential lead 90. The collector terminal of transistor 85 is connected to the base terminal of a second amplifier transistor 91, and the emitter terminal of transistor 85 and the collector terminal of transistor 91 are connected together to ground potential lead 90. The emitter terminal of transistor 91 is connected through the control winding 92 of a relay (not shown) to a positive bias voltage line 93. A transient protection diode 94 is connected across winding 92. The emitter terminal of transistor 91 also is coupled through a capacitor 95 to an output terminal 96 which is connected to ground through an output resistor 97. A signal appearing on output terminal 96 is applied to the input of digital readout component 33, and control winding 92, when energized, closes the relay to complete a circuit from AC source 38 to readout component 33.

Start count gate 34 includes a silicon-controlled rectifier 100, the anode of which is connected to positive voltage supply line 93 and the cathode of which is connected through an output resistor 101 to ground potential line 90. The control or gate terminal of controlled rectifier 100 is connected to lead 60 from circuit 30 through a resistor 102 and a diode 103, the latter being poled so as to allow transmission to resistor 102 of only positive-going pulses. A capacitor 104 connects the point common to diode 103 and resistor 102 to ground potential lead 90, and a resistor 105 is connected between the gate terminal of rectifier 100 and ground. The output of gate circuit 34 is applied to the input of oscillator circuit 35 by means of a lead 106 connected to the cathode of controlled rectifier 100.

Oscillator circuit 35 includes a unijunction transistor 107 having base terminals 108 and 109 and emitter terminal 110. Base terminal 108 is connected through a resistor 111 to positive bias voltage conductor 93, and base terminal 109 is connected through a resistor 112 to ground potential lead 90. Emitter terminal 110 is connected to one terminal of a timing capacitor 113, the other terminal of which is connected to ground potential lead 90. Emitter terminal 110 is connected through a fixed resistor 114 and variable resistor 115 to lead 106 from gate circuit 34. Resistors 114 and 115 together with capacitor 113 comprise a timing circuit for oscillator transistor 107. A voltage divider comprising resistors 116 and 117 is connected from positive bias voltage lead 93 to ground potential lead 90, and a diode 118 connects the junction of resistors 114 and 115 to base terminal 110 of transistor 107. The output of oscillator 35 is applied to relay and driver circuit 36 by a lead 119 connected to base terminal 109 of transistor 107.

Circuit 36 is identical in construction and operation to relay and driver circuit 32. In particular, lead 119 is connected through a resistor 120 to the base terminal of a first amplifier transistor 121, the collector terminal of which is connected to the base terminal of a second amplifier transistor 122. The emitter terminal of transistor 121 and the collector terminal of transistor 122 are connected together to ground potential lead 90. The emitter terminal of transistor 122 is connected through the control winding 123 of a relay (not shown) to positive supply voltage line 93, and a transient protection diode 124 is connected across winding 123. The emitter terminal of transistor 122 is coupled through a capacitor 125 to an output terminal 126 which is connected through an output resistor 127 to ground potential lead 90. A signal appearing on output terminal 126 is applied to the input of digital time readout component 37, and control winding 123, when energized, closes the relay to complete a circuit from AC source 38 to readout component 37.

The apparatus of the present invention operates in the following manner. The operating pressure delivered by source 14 should be in the range equivalent to the head developed by from 3 to 7 inches of water so as to provide a laminar stream of gas from nozzle 13 across central bore 21 of body 20. The apparatus is readily usable in hospitals which have several sources of gas or oxygen, for example, available at this operating pressure range. Nozzle 11 is connected to the liquid to be measured by tubing 12 shown in FIG. 1. If the apparatus is used to monitor urine expelled from a patient, tubing 12 is in communication with a catheter (not shown) inserted in the patient. The apparatus also can be used to monitor chest fluid withdrawn from a patient. On the other hand, the apparatus of the present invention is equally adaptable to monitoring the amount of liquid administered to a patient, for example in intravenous feeding procedures. In this case the liquid to be administered would be stored in receptacle 10 as shown in FIG. 1, and the liquid shown collected in receptacle 25 would enter the patient's body, as through a catheter.

In addition to forming liquid drops in a path, nozzle 11 is constructed to control or regulate the size of drops formed therein. When the apparatus is used for urine monitoring, nozzle 11 is constructed preferably so that 20 drops equal 1 cubic centimeter. To this end, nozzle 11 is provided with an orifice having a diameter of 0.070 inch and a length of 0.010 inch. By virtue of this calibration, the apparatus ultimately provides information in the form of number of cubic centimeters of urine per minute which are the standard units for this physiological information.

Each liquid drop, of a size calibrated by nozzle 11, falls through the laminar stream of gas exiting from nozzle 13 and flowing across the central passage 21 in body 21. As the liquid drop obstructs the stream the pressure at nozzle 17, which is in communication with the stream, is instantaneously decreased. This is a result of the turbulence amplification principle wherein a disturbance in a laminar flow while being relatively small at the point of occurrence is manifested in a relatively larger pressure decrease at a point located downstream from the disturbance. The instantaneous pressure decrease causes transducer 16 to provide an output electrical signal, the transducer being in communication with nozzle 17 and hence the gas stream through line 18. The gas stream can exit from the interior of body 20 through exhaust passages 22, 23. Upon passing through the gas stream, the liquid drops continue to fall through passage 21, through the bore in cap 24, and into receptacle 25 where the liquid is collected.

Each output signal provided by transducer 16 is indicative of a liquid drop exiting from nozzle 16. The output signals are amplified by circuit 30 whereupon they are translated by components 31 and 32 of counting means 19 and ultimately result in a visual count appearing on digital readout component 33. In particular, flip-flop and divider circuit 32 provides a single output pulse in response to the occurrence of two signals from transducer 16. As a result, every other liquid drop is counted by the means 19 shown in FIG. 1. This is to facilitate a correspondence between digital readout equipment 33, which operates on a numerical base of 10, and nozzle 11 which conveniently can be constructed so that 20 liquid drops equal 1 cubic centimeter. As a result, digital readout component 33 can be set conveniently to indicate 1 cubic centimeter upon the occurrence of 10 counts, which indication of course will be cumulative. A signal developed by amplifier 30 is utilized to activate gate 34 and, in turn, oscillator 35 and amplifier and relay 36 so as to operate digital time readout 37 which provides an indication of time elapsed since the passing of the first drop from nozzle 11. As a result, the user upon inspecting the readout components 33 and 37 instantly is provided with information in terms of cubic centimeters per minute.

From the foregoing it is apparent that the present invention accomplishes its intended objects. By virtue of the fact that the sensing medium to be interrupted by liquid drops is a stream of gas and that pneumatic to electrical interface is employed to obtain an indication and count, the system of the present invention is operable independently of the light-transmitting characteristics of the conduits and receptacles which contain and transmit the liquid. As a result of the aforementioned correspondence between the drop size regulation by nozzle 11 and counting means 19, a visual indication in terms of volume per unit of time is obtained.

While a single specific embodiment of the present invention has been described, this has been done by way of illustration, without thought of limitation.

We claim:

1. Apparatus for sensing and counting a flow of liquid drops comprising:
   a. drop-forming means adapted to be connected to a source of liquid for providing liquid drops in a first path;
   b. flow-defining means adapted to be connected to a source of gas under pressure, in a range providing a laminar flow, for providing a flow of gas in a second path in a direction whereby the gas flow is interrupted by a liquid drop;
   c. a pressure transducer in communication with the gas flow for providing an electrical signal in response to interruption of the gas flow by a liquid drop; and
   d. counting means operatively connected to said transducer.

2. Apparatus as defined in claim 1 wherein said drop-forming means comprises a nozzle having an orifice of a diameter and length so as to calibrate number of drops in terms of volumetric units.

3. Apparatus as defined in claim 1 wherein said flow-defining means comprises:
   a. a body having a central passage therethrough for receiving liquid drops in the path defined by said drop-forming means;
   b. a flow-defining nozzle positioned in said body so that the orifice thereof is in communication with the central passage, said nozzle adapted to be connected to a source of gas under pressure in a laminar flow range; and
   c. a receiving nozzle connected to said transducer and positioned in said body so that the orifice thereof is in communication with the gas flow from said flow-defining nozzle.

4. Apparatus as defined in claim 3 wherein the axes of said flow-defining nozzle and said receiving nozzle are coincident and disposed so as to be perpendicular and coplanar with respect to the axis of said body central passage.

5. Apparatus as defined in claim 1 wherein said counting means provides a visual indication in terms of volume per unit of time.

6. Apparatus for sensing and counting a flow of liquid drops comprising:
   a. a drop-forming nozzle adapted to be connected to a source of liquid for providing liquid drops in a first path, said nozzle having an orifice dimensioned so as to calibrate number of drops in terms of volumetric units;
   b. a body supporting said drop-forming nozzle and having a passage therein through which the liquid drops can fall;
   c. a flow-defining nozzle supported in said body and adapted to be connected to a source of gas under pressure in a range providing a laminar flow, said nozzle being positioned so that a flow of gas is provided in a second path in a direction whereby the gas flow is interrupted by a liquid drop;
   d. a receiving nozzle supported in said body and positioned so that the orifice thereof is in communication with the gas flow from said flow-defining nozzle;
   e. a pressure transducer connected to said receiving nozzle by providing an electrical signal in response to interruptions of the gas flow by a liquid drop; and
   f. counting means operatively connected to said transducer for providing an indication of liquid flow in volumetric units.

7. Apparatus as defined in claim 6 wherein said counting means provides a visual indication in terms of volume per unit of time.

8. Apparatus as defined in claim 6 wherein said pressure transducer provides an electrical signal in response to each interruption of the gas flow by a liquid drop.